United States Patent

Tachibana et al.

[11] 3,961,225
[45] June 1, 1976

[54] SURGE ABSORBER

[75] Inventors: Kan-ichi Tachibana; Michihiro Nishioka; Akio Uchida; Mikiya Ono, all of Saitama, Japan

[73] Assignee: Mitsubishi Mining & Cement Company, Ltd., Tokyo, Japan

[22] Filed: Feb. 10, 1975

[21] Appl. No.: 548,663

[30] Foreign Application Priority Data
  Feb. 26, 1974  Japan................................. 49-22679
  Apr. 24, 1974  Japan................................. 49-46234

[52] U.S. Cl.............................. 317/61; 313/231.1; 313/213; 313/214
[51] Int. Cl.²......................................... H02H 3/22
[58] Field of Search............... 317/61, 61.5, 62, 68, 317/69, 70; 315/36, 59; 313/231.1, 217, 218, 220, 221, 213, 214, 494; 331/DIG. 1; 219/121 LM; 29/610, 613, 620, 25.1, 25.14, 25.16

[56] References Cited
UNITED STATES PATENTS

| | | |
|---|---|---|
| 2,487,057 | 11/1949 | Kohring................................. 29/620 |
| 2,942,331 | 6/1960 | Smiley................................... 29/620 |
| 2,966,608 | 12/1960 | Magnusson et al............. 313/231.1 |
| 3,292,049 | 12/1966 | Lucas................................... 315/35 |
| 3,391,371 | 7/1968 | Wright et al..................... 315/36 X |
| 3,486,221 | 12/1969 | Robinson..................... 219/121 LM |
| 3,530,573 | 9/1970 | Helgeland.................... 219/121 LM |
| 3,535,778 | 10/1970 | Falanga et al......................... 29/610 |
| 3,654,511 | 4/1972 | Iwaya................................... 315/59 |
| 3,827,142 | 8/1974 | Bennett et al....................... 29/620 |

Primary Examiner—J D Miller
Assistant Examiner—Patrick R. Salce
Attorney, Agent, or Firm—Edward J. Brenner

[57] ABSTRACT

A novel gap type surge absorber is disclosed. The surge absorber comprises a plurality of carbon thin films isolated from each others at short distances attached to the surface of an insulating body and one material selected from the group consisting of a metal, an alloy and a conductive adhesive as an electrode fixed to each of the plural carbon thin films. The surge absorber is an element based on a new mechanism that when a surge voltage reaches a prescribed value, a discharge is generated owing to emission of electrons between the carbon thin films and thereby a creeping discharge is initiated between the electrodes. The surge absorber has a small electrostatic capacity as well as a small discharge lag and is capable of cutting off a follow current.

1 Claim, 4 Drawing Figures

SURGE ABSORBER

Background of the Invention

The present invention relates to an economical surge absorber which has a small electrostatic capacity as well as a small discharge lag and is capable of cutting off a follow current.

Conventional surge absorbers comprise a gap type lightning arrester, ZnO varistor and the like. The gap type lightning arrester, however, has a large discharge lag and is incapable of cutting off a follow current, and ZnO varistor has an electrostatic capacity of more than 10PF.

This invention has been devised to overcome these defects of the conventional surge absorbers as described hereinabove.

BRIEF SUMMARY OF THE INVENTION

A primary object of the invention is to provide a surge absorber which has a small discharge lag.

Another object of this invention is to provide a surge absorber which has a small electrostatic capacity.

A further object of this invention is to provide a surge absorber which is capable of cutting off a follow current.

A still further object of this invention is to provide a surge absorber which is inexpensive in cost.

According to this invention, there is provided a surge absorber comprising a plurality of carbon thin films isolated from each others respectively at very short distances attached to the surface of an insulating body and one material selected from the group consisting of a metal, an alloy and a conductive adhesive as an electrode directly fixed to each of said plurality of carbon thin films respectively, said metal and alloy being both highly anticorrosive and having a high electric conductivity.

The above and further objects and features of the invention will more fully appear from the following detailed description when the same is read in connection with the attached drawings.

BRIEF DESCRIPTION OF THE ATTACHED DRAWINGS

Figure 3:
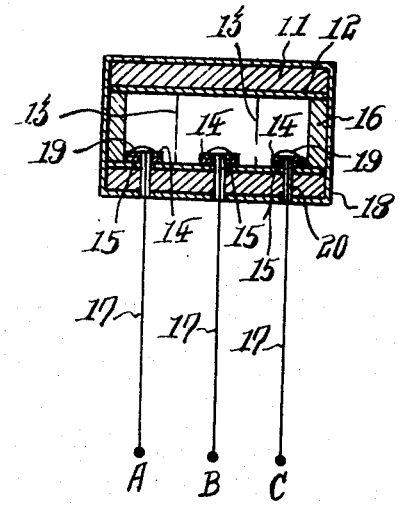
FIG. 3 is a longitudinal sectional view of another surge absorber embodying the invention.
Figure 4:
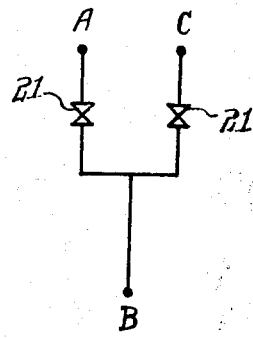
FIG. 4 is an electric equivalent circuit of the element of FIG. 3.

A, B and C of FIG. 4 correspond to respectively A, B and C at the ends of the lead wires of FIG. 3.

DETAILED DESCRIPTION OF THE INVENTION

An insulating body used in this invention is a moulding made of an insulating material. As such an insulating material are preferably Mullite porcelain, Forsterite porcelain, alumina porcelain and the like which have a small dielectric constant. The moulding is not limited in form.

A metal and an alloy used as an electrode in this invention are both highly anticorrosive and have a high electric conductivity, and the metal comprises copper, zinc, nickel and the like and the alloy comprises brass, phosphor bronze, German silver and the like. These metals and alloys are inexpensive in cost.

A conductive adhesive used as an electrode or an adhesive in this invention comprises silver adhesive, copper adhesive, carbon adhesive and the like which provide a high strength.

The attaching of a carbon thin film to the surface of said insulating body is carried out in a known manner as follows: for example, hydrocarbon, especially aromatic hydrocarbon having a greater carbon content, is thermally cracked to produce carbon, and the thus produced carbon is attached to the surface of said insulating body as a carbon thin film.

In this invention, the thus attached carbon thin film is marked with streaks by means of laser, for example, Ar gas laser to be isolated into a plurality of carbon thin films at very short distances. Laser used in this invention is not limited to said Ar gas laser, but carbon dioxide gas laser, helium-neon laser and the like are also preferable as a gas laser. Further, a semi-conductor laser, a solid laser and the like can also be used. The use of said lasers can provides a very quick marking of said carbon thin film with a stabilized and narrow streak which has a width of $10\mu$ at minimum.

Diamond cutting edge is also used to mark said carbon thin film with a streak which has a width of $50\mu \sim 2mm$. Therefore, if a very narrow streak is required, laser is to be used.

Next, the formation of a respective electrode on each of said plurality of carbon thin films is carried out by fixing directly one material selected from the group consisting of said metal, said alloy and said conductive adhesive respectively to each of said carbon thin films. The formation of said electrode on each of said plurality of carbon thin films is also carried out by fixing said metal or said alloy to each of said carbon thin films by means of said conductive adhesive.

In the surge absorber of this invention, when a surge voltage applied to said electrodes thereof reaches a prescribed value, a discharge is generated owing to emission of electrons between said carbon thin films on which said electrodes are fixed and thereby a creeping discharge is initiated between said electrodes. As these discharges can be initiated within a time shorter than $1\mu$ sec, the discharge lag is remarkably small. Namely, in the surge absorber of this invention, when a surge voltage applied is slightly higher than a sparkover voltage, the discharge lag is about $1\mu$ sec, but when said surge voltage is higher, the discharge lag is shorter than $0.1\mu$ sec.

As the surge absorber of this invention breaks off said creeping discharge promptly upon extinction of said surge voltage, it, unlike the conventional gap type lightning arrester, can cut off a follow current even when a voltage lower than a sparkover voltage has been applied to said electrodes thereof.

In the surge absorber of this invention, said structure of the electrodes has an effect of making an electrostatic capacity therebetween small and the use of Mullite porcelain, Forsterite porcelain, alumina porcelain and the like having a small dielectric constant as an insulating material makes this effect more increased, thereby enabling the electrostatic capacity therebetween to be less than 3PF, as compared with the conventional ZnO varistor.

Further, the great feature of this invention resides in that a composite element comprising more than two surge absorbers can be obtained by forming respectively more than three carbon thin films and electrodes in such a manner as described above, thereby enabling said surge absorber to be small-sized. This, combined with the cheapness of said electrode materials and the facility of manufacturing method, makes the surge absorber of this invention remarkably economical.

This invention provides, as described hereinabove, an economical surge absorber which has a small electrostatic capacity as well as a small discharge lag and is capable of cutting off a follow current, therefore it is industrially of great value.

The invention will be understood more readily with reference to the following examples. The examples, however, are intended to illustrate the invention and are not to be construed to limit the scope of the invention.

EXAMPLE 1

Figure 1:
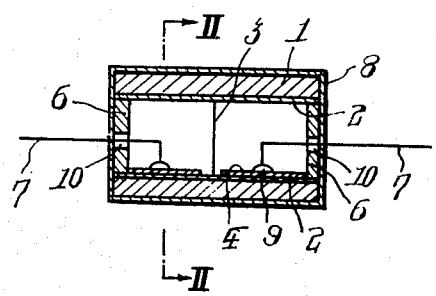
FIG. 1 is a longitudinal sectional view of a surge absorber embodying the invention.
Figure 2:
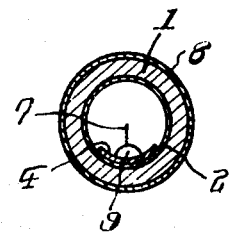
FIG. 2 is a sectional view taken substantially along the line II—II of FIG. 1.

FIG. 1 is a longitudinal view of this example. FIG. 2 is a sectional view taken substantially along the line II—II of FIG. 1.

As an insulating body is used a hollow cylindrical moulding 1 made of Mullite porcelain. This moulding 1 is manufactured by vacuum extruding Mullite porcelain into a hollow cylinderr and then burning said hollow cylinder at a temperature of more than 1,300°C in the air. The formation of a carbon thin film 2 on the inner surface of said moulding 1 is carried out by heating up said moulding 1 to a high temperature of about 800°~1,000°C under vacuum in a vacuum, introducing benzen into the heated inner part of said moulding, cracking thermally said benzen to produce carbon and attaching the thus produced carbon to the inner surface of said moulding 1 as a carbon thin film 2. Then, said carbon thin film 2 thus formed on the inner surface of said moulding 1 is marked with a narrow streak of 50μ in width, by making Ar gas laser hit said moulding 1 in an oblique direction. Then, the streak takes a round with rotation of said moulding 1, thus said carbon thin film 2 is isolated into two carbon thin films by the streak. A copper piece 4 as an electrode 4 is fixed on each of the carbon thin films 2 thus isolated. Next, a hard vinyl piece 6 is fixed to the inner surface of the moulding 1 by means of alpha-cyanoacrylate resin, an instantaneous adhesive and a lead wire 7 fitted on said electrode 4 by means of solder 9 is drawn out through a hole 10 made in said hard vinyl piece 6 to be fixed. Further, the whole element is covered with epoxy resin 8, an insulating coating material.

In the surge absorber of this example, an electrostatic capacity between said electrodes 4, 4 is 2.5PF owing to the structure thereof, and when a sparkover voltage is 400V and a surge voltage is 420V, a discharge lag is 1μ sec, while when a sparkover voltage is the same and a surge voltage is 1,000V, a discharge lag is 0.1μ sec.

Further, when a surge voltage is applied to said electrodes of the surge absorber of this example in addition to 100AC voltage, a current flows only at the moment of application of said surge voltage, but a follow current can be cut off.

EXAMPLE 2

FIG. 3 is a longitudinal sectional view of this example. FIG. 4 is an electric equivalent circuit of FIG. 3.

In this example, three carbon thin films 12 are formed on the inner surface of a hollow cylindrical moulding 11 made of Forsterite porcelain as an insulating material. These three carbon thin films 12 are isolated from each others by two streaks each having a width of 50μ.

A brass piece 14 as an electrode 14 is fixed respectively on each of said three carbon thin films 12 by use of silver adhesive 15 and a lead wire 17 fitted on said electrode 14 by means of solder 19 is also respectively drawn out from a hole 20 made in the moulding 11. Thus, there is obtained a composite element comprising two surge absorbers 21, 21. The central electrode 14 is a common electrode for these two surge absorbers.

As this example is an electric equivalent circuit as shown in FIG. 4, parallel use of said two surge absorbers is possible, that is, even when one of said two surge absorbers is electrically destroyed and kept open, the other is not destroyed, therefore their parallel use is possible.

In the surge absorber of this example, an electrostatic capacity between said electrodes 14, 14 is 2.4PF owing to the structure thereof, and when a sparkover voltage is 400V and a surge voltage is 420V, a discharge lag is 1μ sec, while when a sparkover voltage is the same and a surge voltage is 1,000V, a discharge lag is 0.1μ sec.

Further, when a surge voltage is applied to said electrodes of the surge absorber of this example in addition to 100AC voltage, a current flows only at the moment of application of said surge voltage, but a follow current can be cut off.

What is claimed is:

1. A surge absorber comprising a plurality of carbon thin films isolated from each other respectively at a distance of 10μ – 100μ attached to the surface of an insulating body and a material selected from the group consisting of a metal, an alloy and a conductive adhesive as an electrode directly fixed to each of said plurality of carbon thin films respectively, said metal and alloy being both highly anticorrosive and having a high electric conductivity.

* * * * *